United States Patent Office 3,701,586
Patented Oct. 31, 1972

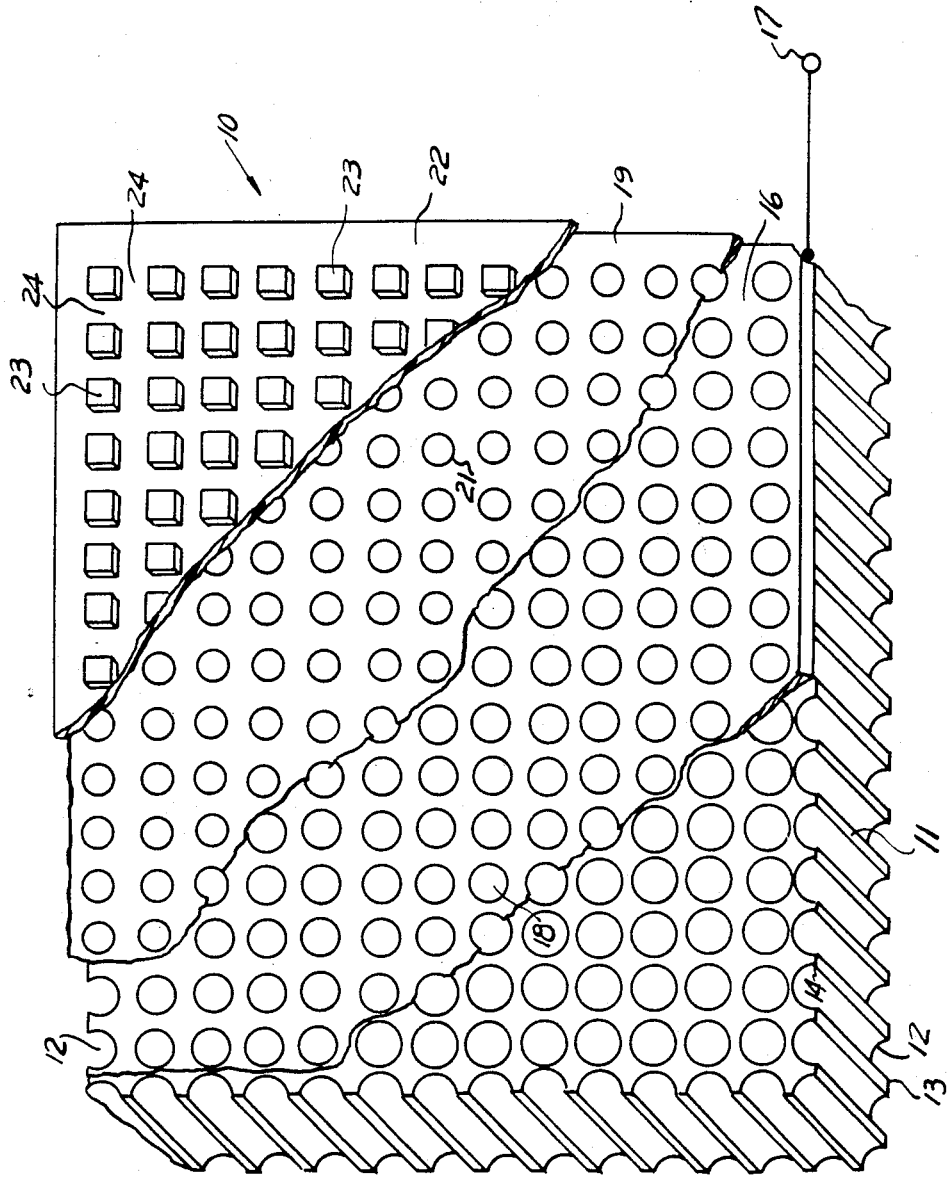

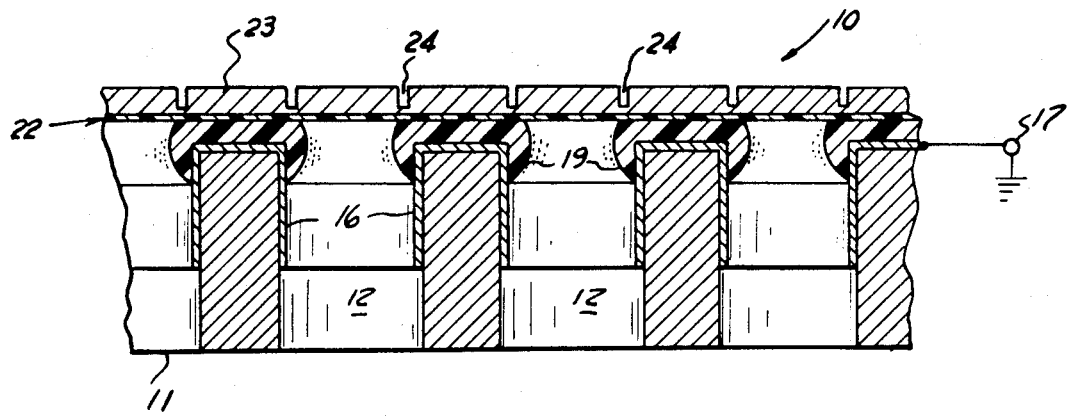
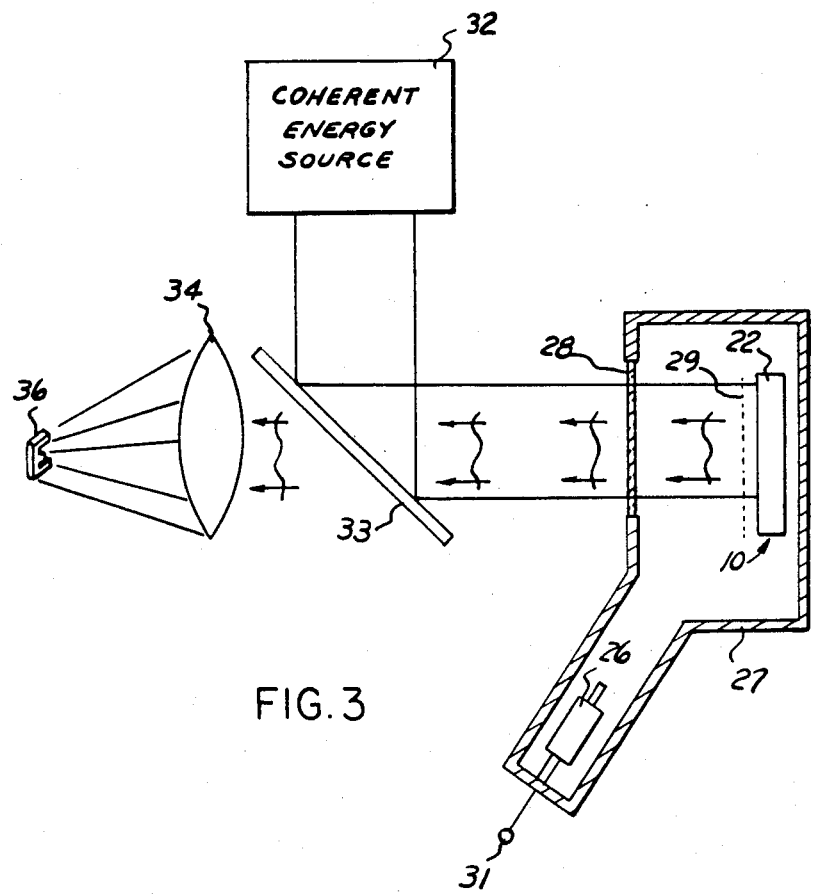

3,701,586
LIGHT MODULATING DEFLECTABLE MEMBRANE
George G. Goetz, 27992 Green Willow,
Farmington, Mich. 48024
Filed Apr. 21, 1971, Ser. No. 136,012
Int. Cl. G02f 1/34
U.S. Cl. 350—161
11 Claims

ABSTRACT OF THE DISCLOSURE

A light modulating deflectable membrane useful in modulating light is described. A deflectable membrane is applied to the surface of a microchannel plate (MCP) so that the membrane extends over the entire surface of the MCP, including the output openings of the channels. The membrane is made reflective by the application of an array of symmetrically arranged elements which are formed from a light reflective material. Electrical separation of the membrane and MCP is achieved by a thin insulating film which is interposed between the membrane and the MCP. The surface of the MCP is placed at ground potential, while the membrane is normally neutral. In this condition the structure is a planar mirror. When electrons are directed to the structure, a charge accumulates on the membrane and forms a pattern dictated by the signals applied to the electron gun. Electrostatic attraction between the MCP surface and the accumulated charges causes deflection of the membrane into the MCP channels. Accordingly, light impinging upon the membrane is phased modulated by dimples in the membrane as electrostatic attraction occurs. Because the deflection at each dimple is dependent upon the charge placed there by the electron gun, and because the charge from the electron gun is dependent upon its energizing signals, image informations contained in the electronic signals is reproduced in the phase of the light reflected from the dimpled membrane. Holographic reconstructions can be produced by energizing the electron gun with electrical signals representative of the interference pattern of a hologram and then illuminating the dimpled surface with coherent energy.

BACKGROUND OF THE INVENTION

Phase modulation of coherent and incoherent light is desirable in various types of systems, and accordingly several systems have been proposed. One type of system which has been proposed for phase modulating coherent light is called the membrane light modulator (MLM). In a membrane light modulator, a base in the form of a planar support is provided with an array of symmetrically arranged circular holes which extend partway through the base material. The base material is fabricated from a nonconductive material. Provision is made at the bottom of each of the holes in the base material for the collection of electrical charges. A very thin light-reflective membrane is then applied to the perforated surface of the base so that all the circular openings within the base are covered by the membrane.

When the structure is inactivated, the light-reflective membrane extending across the surface of the base appears as a mirror so that a planar wavefront of light impinging upon the surface is reflected in the same planar manner. However, when electrostatic charges are applied by some means to the conductive means provided at the bottom of each of the holes, the membrane deflects into the holes because of the electrostatic attraction between the holes and the membrane. This causes the formation of dimples in the surface of the mirror. As a consequence, light impinging upon the dimpled surface is phase modulated in accordance with the depths of the dimples. If the depth of the dimples is allowed to extend as much as one-half a wavelength of the illuminating energy, a phase shift of $2\pi$ can be achieved.

The deflection distance into the holes is dependent upon the charge available at the bottom of the hole. Also, the phase shift suffered by the reflected light wave is dependent upon the distance of deflection into the hole, and accordingly the phase shift is dependent upon the value of charge at the bottom of the hole. As a consequence, the impinging light wave can be phase modulated by varying the charge at the bottom of the holes. Therefore, if the charge present at the bottom of the holes is varied in accordance with some image pattern, the image can be reproduced in a phase modulated form of the reflected light from the dimpled surface of the structure. Such structures suffer several disadvantages. One disadvantage stems from the fact that the circular holes which are contained within the support extend only partially through the support, and therefore it is extremely difficult to achieve a uniform depth for all the hoes. Another disadvantage stems from the fact that the charges which cause the deflection of the membrane are applied to conductive elements at the bottom of the holes. It is rather difficult to apply these conductive elements and also to apply the charge to the conductive elements after they are in place.

SUMMARY OF THE INVENTION

The invention is directed to a light modulating deflectable membrane which overcomes the disadvantages of prior art devices and which is particularly useful in reproducing holographic images from information which can be transmitted by way of electrical signals such as television transmission. A microchannel plate is polished so that one surface has the required flatness characteristics. The formation of microchannel plates is a technique which is known in the art, and an MCP formed by any of the known techniques can be used in conjunction with the inventive concepts. A microchannel plate is an element which contains a large number of substantially parallel channels which extend the entire thickness of the element. Although an MCP has well defined operational characteristics, they are not important here because the selection of an MCP is made because of its physical characteristics and not its operational characteristics. An MCP is selected as a preferred support in the invention because of the large number of symmetrically arranged channels present in the MCP. Accordingly, because fabrication techniques are well known, MCP's serve as a convenient and readily available support in the inventive srtucture. The use of an MCP as the support results in another significant advantage. Because the channels extend through the entire thickness of the MCP, the depth of the holes within the MCP is no longer critical as it is in the piror art devices.

In the formation of the inventive device a thin conductive film or layer is applied to the flat surface of the microchannel plate and into the channels to a depth of at least one diameter so that the entire conductive film can be maintained at the same potential. In operation the MCP surface potential is ground. The conductive film is applied so that the openings of the channels are uninhibited by the film. A thin nonconductive coating, such as a dielectric, is then applied to the conductive layer so that the portion of the conductive layer on the flat surface is covered. This coating is also applied so that the channel holes are uninhibited. A thin film of deformable material is applied to the nonconductive layer. The membrane formed by this coating is applied such that it extends over the entire surface of the microchannel plate, including the openings of the channels within the MCP. The membrane must be capable of retaining a charge pattern on its surface, and therefore must be dielectric. Also, the membrane must be highly reflective to light. Most reflective materials are also conductive and an inconsistency in requirements therefore occurs. This is overcome by applying the membrane in the form of a thin dielectric film. An array of small, electrically isolated light-reflective elements is then applied to the membrane. With this structure, the membrane can retain a charge pattern and incident light is reflected. Consequently, both requirements are fulfilled. Obviously, if a highly reflective dielectric material is found it will serve as the membrane quite nicely, and the array of metallic elements can be eliminated. Because of the complete integrity of the membrane and the close spacing of the reflective elements, the structure is very similar to a plane mirror containing a fine grid pattern when in the inactive state. Accordingly, a plane wavefront of energy impinging upon the surface of the reflective membrane will be reflected in a plane wavefront.

In order to achieve phase modulation of impinging energy, the electrode formed of the thin conductive layer initially applied to the surface of the MCP is grounded. A charge can be placed upon the reflective membrane by the use of an electron gun which places charges on the surface of the membrane in accordance with the control signals presented to the electron gun. Because of the electrostatic attraction forces between the microchannel plate electrode and the charge on the membrane created by the electrons, the membrane is attracted toward the surface of the MCP, causing the formation of dimples within the reflective membrane. These dimples cause a phase modulation of the impinging light. If the membrane is allowed to deflect by an amount which is equal to half a wavelength of the impinging radiation, $2\pi$ phase modulation of the impinging energy can be achieved. The energy can be electromagnetic, such as light, and if it is coherent holographic reconstructions can be formed.

Because the phase modulation of the impinging radiation is dependent upon the deflection of the reflective membrane into the channels of the MCP and, because this deflection is dependent upon the charge applied to the reflective plate, it is possible to phase modulate the impinging light in accordance with a desired pattern simply by controlling the electron gun in accordance with the desired pattern. As an example, holographic reconstructions can be produced with the use of the inventive structure.

As is known, holograms are produced by interfering a reference beam of coherent energy with a coherent beam which has been diffracted by an object. This interference creates an interference pattern which bears the object-bearing information. Accordingly, the interference pattern is permanently stored by some medium, such as a photographic plate. Upon illumination of the interference pattern (photographic plate) with a source of coherent energy, a three-dimensional image of the object is obtained. Because the image information of a hologram is contained in the interference pattern, holographic information cannot be transmitted in the form of electrical signals in the absence of a system for modulating a coherent energy source in accordance with the information carried by the interference pattern. The inventive structure provides a mechanism for modulating the coherent energy by the provision of the deflectable membrane. Accordingly, a holographic charge pattern can be produced by converting the interference pattern into electrical signals and using these signals to control the emission of electrons from the electron gun. The deflection of the membrane at different areas along the microchannel plate is dependent upon the signals derived from the interference pattern, and therefore is useful in reproducing the object information. Consequently, by illuminating the dimpled membrane with a coherent source of energy, it is possible to obtain a three-dimensional visual image of the object instrumental in creating the interference pattern. Because the interference pattern was first converted into electrical signals, it is possible to transmit the interference information in manners available for transmitting electrical signals but which are unavailable for transmitting other forms of signals, such as light and acoustic signals. As examples, television, microwave, and other electrical signal rtansmission techniques can be employed.

BRIEF DESCRIPTION OF THE DRAWINGS

FIG. 1 is an isometric sectionalized showing of a preferred embodiment of the invention.

FIG. 2 is an enlarged sectional view of a preferred embodiment of the invention.

FIG. 3 is a preferred embodiment of a system for producing holograms, utilizing the inventive structure.

DETAILED DESCRIPTION

The inventive light modulator 10 shown in FIG. 1 includes a microchannel plate 11 having a large number of channels 12 which extend the entire thickness of the MCP 11. As is known, the channels 12 of a microchannel plate appear across the entire surface of the MCP and extend in a substantially parallel relationship through the entire thickness thereof.

A thin metal film 16 is applied to the surface of the MCP. As best seen in FIG. 2, metallic film 16 is applied so that the output openings 14 of the channels 12 remain substantially free of restrictive material. This film also extends into the holes by a distance equal to at least the diameter of channels 12 as shown in FIG. 2. The entire surface of film 16 is perforated with holes 18 so that each of the holes 18 appears at locations corresponding to locations of the channels 12 of the MCP 11. It should be noted that FIGS. 1 and 2 are not in proportion, so that thicknesses and other dimensions are greatly exaggerated. A terminal 17 is mechanically and electrically attached to metallic film 16 so that it serves as an electrode through which one surface of MCP 11 can be grounded.

An insulating layer 19 is applied to conductive layer 16. Layer 16 is also applied in a manner insuring the substantial unrestriction of channels 12. Accordingly, a plurality of holes 21 perforates the entire surface of the structure. The holes 21 are located at locations corresponding to the locations of holes 18 and channels 12. As best shown in FIG. 2, the application of the insulating film 19 may cause a slight restriction of channels 12. This restriction, however, is quite small and is not detrimental to the intended use of the MCP structure.

A membrane 22, in the form of a thin layer of dielectric material is applied to the dielectric layer 19. Membrane 22 is applied such that it extends over the entire surface of the MCP, as well as apertures 14 of the channels 12 of the MCP. A dielectric material is used so that charges on the membrane are not free to move laterally along the membrane. A charge pattern is therefore sustained on the membrane. An array of reflective elements 23 is placed on membrane 22. Elements 23 can be square or some other configuration, and are preferably spaced less than one-half the diameter of channels 12. Consequently, the complete structure appears as a reflective mirror having a plane surface and having no visible apertures when viewed from the side upon which the reflective layer 22 is applied. The manner in which the various layers are applied to the MCP forms no part of the invention, and any of various methods presently known to those skilled in the art can be used.

Reflective lands 23 adhere to membrane 22 so that deflection of membrane 22 results in deflection of the lands. Lands 23 are separated by spacings 24 along all sides and are symmetrically arranged along the entire reflective surface 22.

When in the neutral, or unactuated, state the structure appears as a plane reflective mirror having a grid configuration created by spacings 24 between the reflective lands 23. Therefore, a plane wavefront of light impinging upon surface 22 will be reflected in the same plane wavefront but will contain a grid pattern caused by spacing 24. In order to effect a modulation of the radiation impinging upon membrane 22 it is necessary to scan membrane 22 with an electron beam in a manner similar to the scanning of the fluorescent screen of a cathode ray tube. The collection of charges on membrane 22 will result in an electrostatic attractive force between membrane 22 and surface 16. As will be explained hereinafter, the attractive force between membrane 22 and electrode 16 will be proportional to the square of the potential created by the charges. As a consequence, either a positive or a negative potential will result in the attraction of membrane 22 into channels 12. This leads to alternative modes of operation. In one mode, membrane 22 is scanned by electrons with a negative potential on a grid 29 in front of the membrane 22. Consequently, the electrons which pass through the grid 22 accumulate on membrane 22, charging it negatively. Resolution of an image represented by the scanning pattern of the electrons is preserved because elements 23 are small in area and in thickness. Consequently, any deviations in the path of the electrons which degrade resolution are negligible. The charge pattern is erased by grounding the grid 29 and flooding the membrane 22 with electrons. This, of course, requires the secondary electron yield of the elements 23 and the membrane 22 to be greater than one.

In another mode of operation the scanning electrons cause the emission of secondary electrons from elements 23. By providing a positively charged grid in the proximity of membrane 22, these electrons are attracted to the grid. Membrane 22 thus becomes positively charged. The charge pattern would again be erased by grounding the grid 22 and flooding the membrane 22 with electrons. These techniques are pertinent to writing on membrane 22 with low energy electrons. Modifications required for writing with high energy electrons are within the purview of those skilled in the art.

Obviously, because the polarity of the charge is immaterial, charged particles other than electrons can be used, such as positive or negative ions. The accumulation of charges causes a deflection of the membrane 22 into channels 12 of the MCP 11. Because of the deflection of membrane 22 in the channels, reflective elements 23 are also deflected, and a light wavefront impinging upon the surface will be phase modulated in accordance with the distance that membrane 22 extends into channels 12. By permitting membrane 22 to deflect into channels 12 by an amount as much as a half wavelength of the impinging energy, the reflected energy can be phase shifted by a full 360°. Accordingly, a full phase modulation of the incident energy can be effected by the application of a sufficient electrostatic charge to membrane 23 to cause a deflection equal to λ/2.

The deflection Y into the individual channels 12 to a good approximation can be defined by:

$$Y = \frac{11\epsilon_0 V^2}{128 T E t^3} \left[ \frac{1}{\frac{1}{a^2} + \frac{11T}{4Et^3}} \right]$$

where:

$\epsilon_0$ = the modulus of elasticity of membrane 22
$a$ = the diameter of microchannels 12
$t$ = the thickness of the membrane 22
$V$ = the potential created by the accumulated charges
$T$ = the tension of membrane 22
$E$ = the modulus of elasticity of the membrane 22

Because of the application of charges to reflective membrane 22 causes a deflection of the membrane 22 and hence a phase shift of the incident energy, it is possible to phase modulate the incident energy in a desired manner by controlling the application of charges to the membrane. Accordingly, by applying electrical signals representative to the desired pattern to the electron gun which applies the changes to membrane 22, phase modulation of the incident energy according to the desired pattern can be achieved. For this reason, a holographic interference pattern can be converted to electrical signals and used to control the application of charges to membrane 22 by the electron gun. Because holographic information is contained within the signals controlling the electron gun, the holographic information is also represented by the varying deflection of membrane 22 into channels 12. Accordingly, the illumination of reflective membrane 22 with coherent energy will result in the production of an image of the object used to produce the interference pattern.

A system for producing a three-dimensional holographic image by use of the inventive light modulating deflectable membrane is shown in FIG. 3. An electron gun 26 and the inventive light modulating deflectable membrane structure 10 are encased in evacuated casing 27. Deflectable membrane structure 10 is arranged so that the reflective surface 22 faces an optically flat window 28 which is contained within the casing 27.

Although it is not shown, provision is made for grounding electrode surface 16 (FIG. 1) of the MCP 10. A grid 29 can be used to collect secondary emission electrons which may be emitted by the light-modulating structure 10 because of the impingement of electrons thereon.

An input terminal 31 is provided for electron gun 26 so that holographic information in the form of electrical signals can be applied to electron gun 26. It should be noted that the electrical signals representative of the holographic information can be obtained by passing light through the holographic interference pattern and detecting the emitted light with photoelectric cells so that the interference pattern is converted into electrical signals. Alternatively, the holographic interference pattern can be obtained by using acoustical energy and energizing electron gun 26 with electrical signals representative of the acoustical interference pattern. Both of these techniques are known in the art and either of them, as well as others available to those skilled in the art, can be used for transducing the holographic information into electrical signals.

Because the electrical signals which actuate electron gun 36 contain holographic information, the reflective membrane surface 22 of MCP structure 10 is scanned by electrons in a pattern consistent with the interference pattern from which the electrical signals were derived. That is, different areas of membrane 22 receive different numbers of electrons. Accordingly, the electrostatic attraction between electrons and the grounded electrode layer 16 is different from area to area along membrane 22. Hence, the deflection of membrane 22 into channels 12 is different for many of the channels and is consistent with the holographic interference pattern which actuated electron gun 26.

Recovery of the holographic information from the surface of MCP 10 can be effected by illuminating the surface with coherent energy. This is done by using a laser source 32, the output of which is a coherent ray of light. The coherent light is directed by way of a beam splitter 33 to reflective membrane 22 through the optically flat window 28 of the casing 27. The deformations in membrane 22 phase modulate the coherent light in accordance with the deflection into channels 12 and reflect it backwardly to beam splitter 33. The reflected light passes through beam splitter 33 to a lens 34 which focuses the light to form a three-dimensional image 36. Three-dimensional image 36, which is illustrated as an E, is identical, in shape, to the object which formed the interference pattern used to actuate electron gun 26.

The description above refers to the modulation of light. It is understood that any form of electromagnetic energy and other forms of coherent energy will also be phase modulated by the inventive structure. Noncoherent energy can also be modulated using the inventive structure. For example, noncoherent light can be amplitude modulated if Schlieren Optics are also used. This application can be utilized in large screen television systems.

The invention as described with respect to FIGS. 1 and 2 shows reflective elements 23 positioned on the outer surface of membrane 22 so that electrons from the scanning electron gun first strike the reflective elements. This arrangement results in satisfactory operation of the inventive structure. However, a satisfactory operation can also be realized by interchanging the positions of membrane 22 and reflective elements 23. Scanning electrons will then strike membrane 22 directly. Impinging radiation to be modulated will then pass through membrane 22 and be reflected from elements 23. Operationally this arrangement is satisfactory, and it has the advantage that normally the secondary electron emission from the membrane 22 is greater than from the elements 23. However, it is difficult to fabricate because membrane 22 is very thin and this quite fragile. This is significant if an array of reflective elements is used, because the elements must be put on the membrane and the membrane then placed on the substrate.

What is claimed is:

1. A deflectable reflective membrane structure for modulating radiation incident upon said membrane comprising:
   a microchannel plate serving as a support member and having a plurality of channels passing through the entire thickness of said microchannel plate, and conductive means along one surface of said microchannel plate, said conductive means being unrestrictive of said channels;
   a continuous deformable energy reflective membrane positioned along said one surface and over said channels so that said membrane extends across said channels when said structure is unactivated and deflects into said channels when said structure is activated; and means for electrically separating said one surface and said membrane.

2. The structure of claim 1 wherein said means for electrically separating includes a dielectric layer interposed between said conductive layer and said membrane and unrestrictive to said channels.

3. The structure of claim 1 wherein said deformable membrane includes a thin layer of electrically insulating material and energy reflective means.

4. The structure of claim 3 wherein said reflective means includes an array of reflective elements systematically arranged along said membrane.

5. The structure of claim 4 wherein said elements are arranged in a pattern, the space between said elements being small relative to the area of said elements.

6. The structure of claim 1 wherein said conductive means extends into said channels by a distance at least equal to the diameter of said channels.

7. The structure of claim 5 wherein said elements are squares formed on said membrane.

8. The structure of claim 7 wherein said means for electrically separating is a dielectric layer interposed between said one surface and said membrane.

9. The structure of claim 1 wherein said incident radiation has a wavelength $\lambda$ and said channels are at least $\lambda/2$ in length so that said membrane can deflect into said channels by a distance $\lambda/2$ and thereby cause a 360° phase shift of said incident radiation.

10. The structure of claim 3 wherein said electrically insulating materail is interposed between said means for electrically separating and said energy reflective means.

11. The structure of claim 3 wherein said energy reflective means is interposed between said means for electrically separating and said electrically insulating material.

References Cited
UNITED STATES PATENTS 2,910,532 10/1959 Auphan _____ 178—7.5 D
3,609,222 9/1971 Howarth _____ 178—5.4 BD DAVID SCHONBERG, Primary Examiner R. J. STERN, Assistant Examiner U.S. Cl. X.R.

178—7.5 D; 313—91